United States Patent
Ishikura et al.

(10) Patent No.: US 9,424,968 B2
(45) Date of Patent: Aug. 23, 2016

(54) MAGNETIC MATERIAL FOR ANTENNAS, ANTENNA, AND WIRELESS COMMUNICATION DEVICE

(75) Inventors: Tomokazu Ishikura, Tokyo (JP); Michihiro Muramoto, Tokyo (JP); Akihiro Harada, Tokyo (JP); Katsumi Kawasaki, Tokyo (JP); Tomofumi Kuroda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 441 days.

(21) Appl. No.: 13/351,722

(22) Filed: Jan. 17, 2012

(65) Prior Publication Data

US 2012/0229354 A1    Sep. 13, 2012

(30) Foreign Application Priority Data

Mar. 9, 2011    (JP) ................. 2011-051829

(51) Int. Cl.
*H01Q 13/00*    (2006.01)
*C04B 35/00*    (2006.01)
(Continued)

(52) U.S. Cl.
CPC .............. *H01F 1/10* (2013.01); *C04B 35/2633* (2013.01); *C04B 35/2641* (2013.01); *C04B 35/2683* (2013.01); *C04B 35/62685* (2013.01); *C04B 38/00* (2013.01); *H01Q 1/243* (2013.01); *H01Q 1/364* (2013.01); *H01Q 5/00* (2013.01); *H01Q 9/42* (2013.01); *C04B 2111/00844* (2013.01); *C04B 2235/3206* (2013.01); *C04B 2235/3208* (2013.01); *C04B 2235/3213* (2013.01);
(Continued)

(58) Field of Classification Search
CPC .................................................. C04B 35/2633
USPC ........................................................... 343/787
See application file for complete search history.

(56) References Cited

U.S. PATENT DOCUMENTS

| | | | |
|---|---|---|---|
| 2001/0050637 A1 | 12/2001 | Aoyama et al. | |
| 2003/0038274 A1* | 2/2003 | Suematsu | B32B 18/00 252/62.63 |

(Continued)

FOREIGN PATENT DOCUMENTS

| | | |
|---|---|---|
| JP | A-2003-055038 | 2/2003 |
| JP | B2-3625191 | 3/2005 |
| JP | A-2005-278067 | 10/2005 |
| JP | A-2008-228227 | 9/2008 |
| JP | A-2010-238748 | 10/2010 |
| WO | WO 2006/064839 A1 | 6/2006 |

OTHER PUBLICATIONS

Meshram et al. ("Characterization of M-type barium hexagonal ferrite-based wide band microwave absorber" Journal of Magnetism and Magnetic Materials 271 (2004) p. 207-214).*

(Continued)

*Primary Examiner* — Dameon E Levi
*Assistant Examiner* — Ricardo Magallanes
(74) *Attorney, Agent, or Firm* — Oliff PLC

(57) ABSTRACT

A magnetic material for antennas including: an M-type hexagonal ferrite represented by the following general formula (1) as a main phase, $MA.Fe_{12-x}.MB_x.O_{19}$ (wherein MA is at least one kind selected from the group consisting of Sr and Ba, MB is MC or MD, MC is at least one kind selected from the group consisting of Al, Cr, Sc and In, MD is an equivalent mixture of at least one kind selected from the group consisting of Ti, Sn and Zr and at least one kind selected from the group consisting of Ni, Zn, Mn, Mg, Cu and Co, X is a number from 1 to 5), and an average crystal particle diameter is equal to or greater than 5 μm.

9 Claims, 2 Drawing Sheets

(51) Int. Cl.
*B05D 5/12* (2006.01)
*H01F 1/10* (2006.01)
*H01Q 1/24* (2006.01)
*H01Q 1/36* (2006.01)
*H01Q 5/00* (2015.01)
*H01Q 9/42* (2006.01)
*C04B 35/26* (2006.01)
*C04B 35/626* (2006.01)
*C04B 38/00* (2006.01)
*C04B 111/00* (2006.01)

(52) U.S. Cl.
CPC . *C04B2235/3215* (2013.01); *C04B 2235/3217* (2013.01); *C04B 2235/3224* (2013.01); *C04B 2235/3232* (2013.01); *C04B 2235/3241* (2013.01); *C04B 2235/3244* (2013.01); *C04B 2235/3263* (2013.01); *C04B 2235/3272* (2013.01); *C04B 2235/3275* (2013.01); *C04B 2235/3279* (2013.01); *C04B 2235/3281* (2013.01); *C04B 2235/3284* (2013.01); *C04B 2235/3286* (2013.01); *C04B 2235/3293* (2013.01); *C04B 2235/3298* (2013.01); *C04B 2235/3418* (2013.01); *C04B 2235/767* (2013.01); *C04B 2235/786* (2013.01)

(56) References Cited

U.S. PATENT DOCUMENTS

| | | | |
|---|---|---|---|
| 2005/0003199 A1* | 1/2005 | Takaya et al. | 428/413 |
| 2005/0176885 A1* | 8/2005 | Sekiba et al. | 524/863 |
| 2005/0253756 A1 | 11/2005 | Kuroda et al. | |
| 2007/0020489 A1* | 1/2007 | Yamazaki et al. | 428/842.8 |
| 2008/0007377 A1* | 1/2008 | Ishiwaki et al. | 335/297 |
| 2008/0036671 A1 | 2/2008 | Gonda et al. | |
| 2010/0068512 A1* | 3/2010 | Imaoka et al. | 428/336 |
| 2011/0001672 A1* | 1/2011 | Harihara | 343/702 |

OTHER PUBLICATIONS

Lee et al. ("M-type Hexaferrite for Gigahertz Chip Antenna Applications" IEEE Magnetics Letters, vol. 2 (2011)).*
Kagotani et al. "Enhancement of GHz electromagnetic wave absorption characteristics in aligned M-type barium ferrite . . . " Journal of Magnetism and Magnetic Materials 272-276 (2004) e1813-e1815.*
Bae et al. "Miniaturized Broadband Ferrite T-DMB Antenna for Mobile-Phone Applications" IEEE Transactions on Magnetics, vol. 46, No. 6, Jun. 2010.*
Apr. 22, 2014 Office Action issued in Japanese Patent Application No. JP-2011-051829 w/translation.

* cited by examiner

MAGNETIC MATERIAL FOR ANTENNAS, ANTENNA, AND WIRELESS COMMUNICATION DEVICE

CROSS-REFERENCES TO RELATED APPLICATIONS

This application relates to and claims priority from Japanese Patent Application No. 2011-051829, filed on Mar. 9, 2011, the entire disclosure of which is incorporated herein by reference.

BACKGROUND OF THE INVENTION

1. Field of the Invention

The present invention relates to a magnetic material suitable for antenna use, as well as to an antenna and a wireless communication device using the same.

2. Description of Related Art

In recent years, wireless signal frequencies used in wireless communication devices such as portable telephones and personal digital assistants have been increasing to a higher frequency band. For example, in portable telephones of the first generation, the frequencies being used were in the 800 MHz band, whereas in portable telephones of the third generation which began to be available in 2001, the frequencies being used are in the 2 GHz band, and an antenna that could be used in the GHz band is needed, including the use of GPS, Bluetooth and wireless LAN. Along with the addition of the multiple functions of the wireless communication devices, a multi-band/mode corresponding to a plurality of wireless systems has been developed, and an antenna used for such wireless communication devices needs to be available in a wide frequency band. Recently, along with a size reduction of the wireless communication device, a further size reduction of the antenna itself has also become an urgent issue. Therefore, for recent antennas used for wireless communication devices, a widening of the bandwidth in high frequencies and a size reduction are both desired.

Regarding this technique, for example, patent document 1 discloses a chip antenna element of a microstrip structure for the purpose of size reduction, higher gain and obtaining wide bandwidth characteristics by appropriately selecting the shapes of emitting electrodes and ground electrodes. Patent document 2 discloses a hexagonal ferrite containing a Y-type ferrite as the main phase and an antenna using the same. Patent document 3 proposes an antenna using, as an electromagnetic bond adjustor, a nano composite magnetic dielectric material in which superparamagnetic nano particles are dispersed in a non-magnetic matrix. Patent document 4 discloses a composite magnetic material formed by a magnetic oxide, having Co substitutional W-type hexagonal ferrite as the main phase, dispersed in the resin and an antenna using the same. Patent document 5 discloses an antenna apparatus comprising an insulator layer made of an oxide magnetic material comprising a Y-type, a Z-type or a M-type ferrite compound.

PRIOR ART REFERENCES

[Patent Document 1] Japanese Patent No. 3625191
[Patent Document 2] WO2006/064839
[Patent Document 3] Japanese Patent Laid-open Publication No. 2008-228227
[Patent Document 4] Japanese Patent Laid-open Publication No. 2010-238748
[Patent Document 5] Japanese Patent Laid-open Publication No. 2005-278067

SUMMARY OF THE INVENTION

Problem to be Solved by the Invention

Regarding a size reduction of an antenna, considering that a wavelength shortening rate of an electromagnetic wave is equal to a decreasing rate of a phase velocity in a transmission medium and that the phase velocity, theoretically, is inversely proportional to a square root of a product of a relative permeability and a relative permittivity of a medium, in general, the use of a material with a permeability and/or permittivity that is greater than those in a vacuum, as a base material or matrix of the antenna, enables the wavelength of the electromagnetic wave that propagates through the antenna to be shortened, thereby reducing the size of the antenna. Specifically, the wavelength $\lambda$ of the electromagnetic wave (radio wave) that passes through the magnetic material is represented by $\lambda \propto 1/\sqrt{(\mu'r \times \in'r)}$ (wavelength shortening effect). The factor $\mu'r$ used herein represents a real part of a complex relative permeability $\mu r$ of a magnetic material, and the factor $\in'r$ represents a real part of a complex relative permittivity $\in r$ of the magnetic material. The term "wavelength shortening rate" used herein is a value represented by the "wavelength of an electromagnetic wave that propagates through a transmission medium/wavelength of an electromagnetic wave in a vacuum," and the smaller the value, the higher the wavelength shortening effect.

Regarding this point, for example, Patent document 1 includes a description that relates to a size reduction of an antenna by increasing the relative permittivity. However, when a base material with a large relative permittivity is used in the antenna disclosed in Patent document 1, the frequency band which obtains high efficiency would be narrowed, and as a result, the available frequency band would be limited disadvantageously.

When a magnetic material such as the Y-type hexagonal ferrite disclosed in Patent document 2 is used, the magnetic loss in the high frequency band of GHz or more would be excessive, and also in this case, the available frequency band would be limited disadvantageously.

Furthermore, in the antenna disclosed in Patent document 3, since the particle diameter of the magnetic nanoparticle being used is literally of nanometer-order, the dispersibility to the resin material which is a dispersion medium is insufficient, and due to the difficulty in high-filling, it is difficult to achieve sufficient antenna performance. In addition, since the handling property would be reduced and the manufacturing cost increased, it is hard to say that such magnetic nanoparticle is suitable for mass production.

On the other hand, since the composite magnetic material disclosed in Patent document 4 by the present applicant uses a W-type ferrite, there is an advantage in that the magnetic loss and dielectric loss at high frequencies can be decreased. However, since the permeability of the W-type ferrite is relatively small and a complex that is formed by mixing the W-type ferrite with resin is used, the entire permeability would be further decreased. Thus, in view of a further size reduction of an antenna by sufficiently decreasing the above-mentioned wavelength shortening rate, the complex magnetic material disclosed in Patent document 4 may be insufficient.

As described above, Patent document 5 discloses a ferrite with various compositions as materials for antennas. However, the detailed material physical properties thereof are unclear, and in general, also for antennas using those materials, it is considered that the magnetic loss in a high frequency band of GHz or more is disadvantageously high.

The present invention has been made in light of the above, and the object of the present invention is to provide a magnetic material for antennas that is available in a wide band and with high efficiency at high frequencies and that may realize a small antenna suitable for mass production with excellent handling property and economical efficiency in manufacturing, as well as an antenna and a wireless communication device using the same.

Means for Solving the Problem

In order to solve the above problem, the present inventors have found an effective solving means for the above problem and attained the present invention by focusing on the compositions and physical properties of a ferrite having a particular crystal structure and with further studies.

That is, a magnetic material for antennas according to the present invention comprises a M-type hexagonal ferrite represented by the following general formula (1) as a main phase, $MA.Fe_{12-x}.MB_x.O_{19}$ ... (1), wherein an average crystal particle diameter is equal to or greater than 5 μm.

In the above general formula (1), "MA" represents at least one kind of metallic element selected from the group consisting of Sr and Ba, "MB" represents MC or MD, "MC" represents at least one kind of metallic element selected from the group consisting of Al, Cr, Sc and In, "MD" represents an equimolar amount mixture of at least one kind of metallic element selected from the group consisting of Ti, Sn and Zr and at least one kind of metallic element selected from the group consisting of Ni, Zn, Mn, Mg, Cu and Co. X represents a number from 1 to 5 (for example, 1, 1.5, 2, 3 ... 5, etc.).

In the above, the "main phase" refers to a main component in a magnetic powder (a component having a ratio with respect to the entire particle that exceeds 50% by mass). The "average crystal particle diameter" refers to a median diameter D50% measured by a method that is specifically mentioned in the examples described later.

When the present inventors measured the characteristics of an antenna that was manufactured using a magnetic material for antennas with this configuration, it was found that this antenna not only had superior effective bandwidth and efficiency at high frequencies compared to the conventional antennas but also was capable of a sufficient size reduction. Although the details of a mechanism of action which provides such advantageous effect are still not yet clear, it is, for example, assumed as described below. However, the effects are not limited thereto (same below).

In a magnetic material for antennas comprising a ferrite with the above-mentioned composition and an average crystal particle diameter equal to or greater than 5 μm, since the M-type hexagonal ferrite which is the main phase includes a sub-component metal (above-mentioned MB) in addition to the main component metal (above-mentioned MA and Fe), the barrier of a crystal magnetic anisotropic energy that blocks the direction transformation of a magnetic moment is decreased, thereby causing a natural resonance frequency f0(n) to be shifted (transition) more towards the lower frequency side, i.e. the real part μ'r of a complex relative permeability is increased more. More specifically, the natural resonance appears in the frequency band of approximately 5 GHz or higher, and the magnetic loss that is caused by the natural resonance at a frequency lower than the above may be sufficiently suppressed. Since the magnetic material for antennas has sufficient crystal growth such that particularly the average crystal particle diameter would be equal to or greater than 5 μm, the resonance of the magnetic domain wall becomes remarkable at an alternate magnetic field at lower frequencies, i.e. the magnetic domain wall resonance frequency f0(d·w) shifts (transition) more towards the lower frequency side. More specifically, the magnetic domain wall resonance appears at a frequency band of appropriately 1 GHz or lower, and the magnetic loss caused by the magnetic domain wall resonance at frequencies exceeding the above may be sufficiently suppressed. As a result, it is assumed that the loss factor tan δμ of the permeability (imaginary part μ"r of complex relative permeability μr/real part of μ'r of complex relative permittivity μr) was effectively reduced over a wide high frequency band of approximately 1-5 GHz and an excess decrease in the efficiency caused by the increase in magnetic loss was effectively suppressed.

In this case, as described above, since the real part of the relative permeability would be increased, the product of the permeability and permittivity of the entire material would be large compared to the conventional product, thereby enabling the wavelength shortening effect to be effectively increased and shortening the wavelength of the electromagnetic wave that is to be received. As a result, the size of the antenna is reduced. In addition, since the powder particle diameter at the material stage is sufficiently large at approximately 1 μm, the handling property is more superior compared to when the conventional magnetic nanoparticle is used, and the increase in cost for antenna manufacturing can be prevented, and consequently, mass production and economical efficiency can be significantly improved.

In light of the above, for the magnetic material for antennas, it is preferable that the natural resonance frequency f0(n) is equal to or greater than 5 Ghz and the magnetic domain wall resonance frequency f0(d·w) is equal to or smaller than 0.8 GHz. For the magnetic material for antennas, it is preferable that the real part (μ'r) of the complex relative permeability at, for example, 2 GHz is equal to or greater than 1.2, and the magnetic loss thereof (loss factor tan δμ of permeability) is equal to or smaller than 0.01. Furthermore, for the magnetic material for antennas, it is preferable that the real part (∈'r) of the complex relative permittivity at 2 Ghz is equal to or smaller than 30 and the dielectric loss thereof (loss factor tan δ∈ of permittivity) is equal to or smaller than 0.05.

The magnetic material for antennas according to the present invention may further comprise at least one kind selected from the group consisting of 0.1-3% by mass of $SiO_2$, 0.5-5% by mass of CaO and 0.5-8% by mass of $Bi_2O_3$. The term "% by mass" used herein refers to the content ratio with respect to the total amount of the magnetic component (in accordance with SI unit) and is substantially the same as the weight basis (% by weight, wt %) (same below). By including these compounds as sub-components with such content ratio, there is an advantage of facilitating acceleration of the crystal particle growth or facilitating uniformity.

The antenna according to the present invention can be effectively manufactured using a magnetic material for antennas of the present invention, and this antenna comprises: a base substance comprising the above magnetic material; a conductor that is provided on a surface or inside of the base substance; and a feed terminal that is connected to the conductor and supplies an electrical energy to the conductor. In view of a further decrease in the permittivity in the antenna in its entirety, it is useful if at least a part of the antenna (for example, a sintered compact as a base substance formed of the magnetic material for antennas) is porous. If so, the permittivity of the base substance of the antenna, therefore the permittivity of the antenna itself, is further reduced to further decrease the dielectric loss, thereby enabling a further improvement in the efficiency of the antenna. In view of especially increasing the antenna efficiency, it is preferable that the base substance is a sintered compact with a void ratio of 1-40%.

Furthermore, the wireless communication device according to the present invention is effectively obtained using the antenna of the present invention and is characterized by comprising the above-mentioned antenna of the present invention.

Effect of the Invention

According to the magnetic material for antennas of the present invention, a particular M-type hexagonal ferrite is included as the main phase and the average crystal particle diameter is equal to greater than 5 μm. Thus, at high frequencies, the bandwidth is maintained sufficiently widely and the wavelength of the electromagnetic wave to be received is shortened, thereby reducing the size of the antenna or a wireless communication device comprising the same. Furthermore, since the magnetic material is easily handled in the manufacturing step (high handling property), it is extremely suitable for mass production, and as a result, the characteristics, productivity and economical efficiency of the antenna and the wireless communication device using the above magnetic material can be improved.

DETAILED DESCRIPTION OF THE EMBODIMENTS

Figure 1:
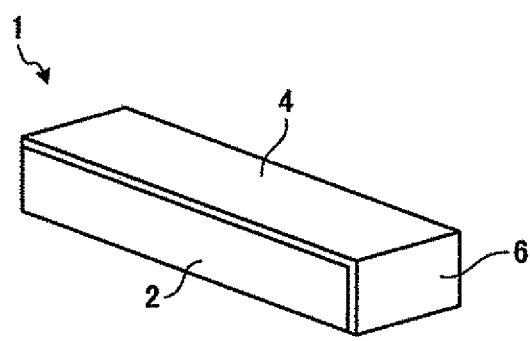
FIG. 1 is a perspective view conceptually showing a configuration of a preferable embodiment of an antenna that is formed with a magnetic material for antennas of an embodiment.

Embodiments of the present invention will be described below. Positional relationships such as vertical and lateral positions are based on those shown in the drawings unless otherwise specified. Moreover, dimensional scales for the drawings are not limited to those shown in the drawings. Furthermore, the following embodiments described below are merely examples based on which the present invention will be described. The present invention is not limited to the embodiments. Various modifications can be made without departing from the scope of the present invention.

[Magnetic Material for Antennas]

A magnetic material for antennas of the present embodiment contains a M-type hexagonal ferrite as a main phase and has an average crystal particle diameter D50 of 5 μm or more. The M-type hexagonal ferrite is represented by the following formula (1):

$$MA \cdot Fe_{12-x} \cdot MB_x \cdot O_{19} \tag{1}$$

wherein "MA" represents at least one kind of metallic element selected from the group consisting of Sr and Ba, "MB" represents MC or MD, "MC" represents at least one kind of metallic element selected from the group consisting of Al, Cr, Sc and In, "MD" represents an equimolar amount compound of at least one kind of metallic element selected from the group consisting of Ti, Sn and Zr and at least one kind of metallic element selected from the group consisting of Ni, Zn, Mn, Mg, Cu and Co, and X is a number between 1 and 5.

It is preferable that the magnetic material for antennas of the present embodiment be made of a single phase of a M-type hexagonal ferrite represented in the above formula (1). However a phase different from the M-type hexagonal ferrite may also be included as long as the above-mentioned operational advantage is not destroyed. In addition to the magnetic component comprising a M-type hexagonal ferrite as the main phase, at least one kind of element selected from the group consisting of $SiO_2$, $CaO$ and $Bi_2O_3$ may also be included. In such a case, although the content ratio thereof is not particularly specified, 0.1-3% by mass, 0.5-5% by mass and 0.5-8% by mass are preferable, respectively in that order.

According to the magnetic material for antennas composed as described above, the M-type hexagonal ferrite included as the main phase comprising a sub-component metal (MB) in addition to a main component metal (above-mentioned MA and Fe) causes a real part of a complex relative permeability to be increased and the crystal growth to be sufficient such that the average crystal particle diameter is equal to or greater than 5 μM. Thus, a magnetic domain wall resonance frequency $f0(d \cdot w)$ can be shifted (transitioned) more towards the lower frequency side. This enables a significant decrease in the loss factor $\tan \delta\mu$ of the permeability over a wide high frequency band of approximately 1-5 GHz, and consequently, an excessive decrease in efficiency caused by the increase in the magnetic loss can be sufficiently suppressed.

Since the real part of the complex relative permeability can be increased, it is possible to increase the product of the permeability and permittivity of the entire material when compared to the conventional material. This enables an improvement in the wavelength shortening effect and may provide a size reduction of the antenna. Since the handling property of the material powder also can be improved, it is possible to significantly improve the economical efficiency and mass productivity in antenna manufacturing.

In light of the above points, in the magnetic material for antennas of the present embodiment, preferably, the natural resonance frequency $f0(n)$ is equal to or greater than 5 GHz and the magnetic domain wall resonance frequency $f0(d \cdot w)$ is equal to or smaller than 0.8 GHz. Moreover, the magnetic material for antennas of the present embodiment is especially useful if the real part of the complex relative permeability at, for example, 2 GHz is equal to or greater than 1.2 and the magnetic loss is equal to or smaller than 0.01. Furthermore, the magnetic material for antennas of the present embodiment is especially useful if the real part of the complex relative permittivity at 2 GHz is equal to or smaller than 30 and the dielectric loss is equal to or smaller than 0.05.

If the magnetic material for antennas of the present embodiment further contains at least one of 0.1-3% by mass of $SiO_2$, 0.5-5% by mass of $CaO$ and 0.5-8% by mass of $Bi_2O_3$, the crystal grain growth as the magnetic material may be easily accelerated or controlled. Thus, the average crystal particle diameter of the magnetic material can be more effectively and easily adjusted to a size equal to or greater than 5 μm.

[Antenna]

Next, FIG. 1 is a perspective view conceptually showing a configuration of a preferable embodiment of an antenna that is formed with a magnetic material for antennas of the present invention. Antenna 1 has at least one conductor 4 formed on the surface and/or inside of a base substance 2. The base substance 2 is formed by using the above-mentioned magnetic material for antennas of the present embodiment, and the shape thereof is not particularly limited. Various shapes that are required when mounting in wireless communication devices may be employed, and in general, for example, a rectangular block as shown in FIG. 1 is preferably used.

When the base substrate 2 is, for example, a sintered compact (ceramic sintered compact), such base substrate may be manufactured in a normal ceramic manufacturing process. An example will be explained below. First, each ingredient is weighed such that the composition after sintering would become a desired composition, then the ingredients are wet blended for a predetermined amount of time, and a ferrite precursor formed of a metal compound containing a metallic element that comprises a M-type hexagonal ferrite is prepared. The metal compound includes an iron (Fe) compound and other metallic (MA, MB) compounds, and raw materials may include, for example, oxides such as $Fe_2O_3$ as iron compounds, and oxides such as $BaCO_3$ ($SrCO_3$), $TiO_2$, $Mn_3O_4$ as other metallic compounds. Alternatively or additionally, oxides including Al, Cr, Sc, In, Ti, Sn, Zr, Ni, Zn, Mn, Mg, Cu, Co, Zn, etc. may also be used.

For a wet blend process, in addition to, for example, a ball mill or a bead mill using a media made of steel, a blender, an agitator, a disperser, etc. may be applied accordingly.

Next, after the ferrite precursor is subjected to heat treatment (calcination), for example, in the atmosphere, under an appropriate temperature and for an appropriate time and a predetermined amount of a given additive (at least one kind of $SiO_2$, CaO (form of addition is ($CaCO_3$)) and $Bi_2O_3$ of the above-mentioned content ratio) is added as needed, a grinding process is performed for an appropriate amount of time to obtain a powder of a M-type hexagonal ferrite. If needed, additives that are well-known in the art such as burn up agents, dispersing agents, lubricants, shaping assistants, etc. which disappear in the later baking process may be added. When the burn up agent is used, fine voids may be formed inside of the base substance 2, i.e. a sintered compact, to make the base substance 2 porous. Thus, the permittivity of the base substance 2 therefore the antenna 1 in its entirety can be decreased to reduce the dielectric loss, thereby enabling a further improvement in the efficiency of the antenna 1. That is, there is a tendency that the higher the void ratio, the lower the permittivity and permeability, and an enhancement in the above-mentioned operational advantage due to the decrease in the permittivity is increased. In light of the above, it is preferable that the base substance 2, i.e. the sintered compact, contains an appropriate amount of voids, and more specifically, the void ratio of the base substance 2, i.e. the sintered compact, is, preferably, approximately 1-40%, and more preferably 5-35%.

After the prepared ingredient powder is granulated by an appropriate method and shaped into a desired shape under a predetermined pressure, the compact is subjected to heat treatment (baking), for example, in the atmosphere, under an appropriate temperature and for an appropriate time to obtain the base substance 2 which is a sintered compact. The average crystal particle diameter of this sintered compact may be formed such that size grows from a fine crystal particle diameter of 1 µm or lower to 5 µm or higher by appropriately controlling the baking condition. In this case, the average crystal particle diameter of the sintered compact can be increased or decreased by the processing temperature and the processing time for baking. For example, the higher the processing temperature or longer the processing time, there is a tendency for the average crystal particle diameter of the sintered compact to be large. Moreover, there is a tendency of an addition of the above-mentioned sub-component causing easier acceleration of the crystal particle growth or uniformity For example, various apparatuses described above, i.e. in addition to a ball mill or a bead mill using a media such as a ball mill made of steel, a blender, an agitator, a disperser, etc. may be appropriately used also in the grinding process of a ferrite precursor.

The conductor 4 formed on a surface of the base substance 2 may be formed, for example, by performing an appropriate method such as printing, deposition, lamination or plating to copper or copper alloy, and in FIG. 1, a feed terminal 6 provided at another surface of the base substance 2 may be electrically connected to the conductor 4. The shape of the conductor 4 is also not specifically limited, and in addition to a plane sheet or a plane film as described in FIG. 1, various shapes such as meandering, helical type may be used. The feed terminal 6 is a terminal for electrically connecting the conductor 4 with the outside feeder line, and the voltage supplied from the predetermined feeder line is applied to the conductor 4 via the feed terminal 6.

[Wireless Communication Device]

Figure 2:
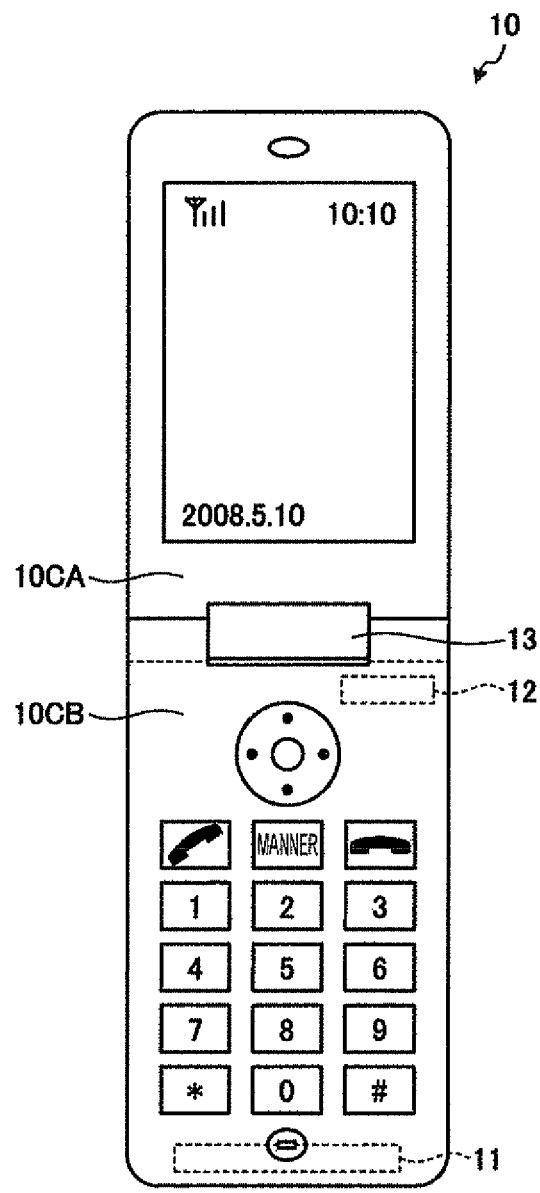
FIG. 2 is a plan view showing a schematic configuration of a preferable embodiment of a wireless communication device comprising an antenna using a magnetic material for antennas of an embodiment.

FIG. 2 is a plan view (front view) showing a schematic configuration of a preferable embodiment of a wireless communication device comprising an antenna using a magnetic material for antennas of the present invention. A portable telephone 10 which is a wireless communication device is a type of folding portable terminal in which a first casing 10CA and a second casing 10CB are connected through a hinge 13, and the frequency band to be used is, for example, 2 GHz band. Inside the second casing 10CB, a first antenna 11 (antenna) is positioned at an end opposed to the hinge 13. The first antenna 11 is a transmit/receive antenna for wireless communication of the portable telephone 10, and is used for transmission and reception of radio waves for exchanging data for communication and e-mails, etc. between the portable telephone 10 and the base station.

Inside the second casing 10CB, a second antenna 12 (antenna) is positioned at the opposite side of the hinge 13. The second antenna 12 is, for example, a receiving antenna used for receiving GPS wireless signals and is used for receiving radio waves transmitted from GPS satellites. The frequency band thereof is, for example, 1.5 Ghz band.

In the portable telephone 10 with this configuration, the base substance of the first antenna 11 is formed using a magnetic material for antennas of the present invention. This enables a size reduction of the first antenna 11, and the first antenna 11 can be used in a wide band (for example, several tens of MHz) in frequencies used in wireless communication of the portable telephone 10 (in the above example, 2 GHz band). Since the first antenna 11 can be reduced in size, the positional degree of freedom of devices, components, wires, etc. provided inside the portable telephone 10 can be increased, thereby reducing the size of the casing of the portable telephone 10.

The base substance of the second antenna 12 is also formed using the magnetic material for antennas of the present invention. This enables a size reduction of the second antenna 11, and the second antenna 12 can be used in a wide band (for example, several tens of MHz) in a frequency band used for receiving GPS wireless signals. Furthermore, although there is a tendency of, in general, the position for the second antenna 12 inside the casing of the portable telephone 10 being limited, according to the present invention, the second antenna 12 can be reduced in size, thereby enabling an improvement in the positional degree of freedom of the second antenna 12 in the casing.

As described above, the present invention is not limited to each of the above-mentioned embodiments, and there may be various modifications made as long as the content is not changed. For example, the magnetic material for antennas of the present invention is not limited to the antenna 1 and an antenna of the portable telephone 10, but may also be applied to general wireless communication devices using the GHz band, especially 2-5 Ghz band. The wireless communication device of the present invention may include, in addition to the portable devices, for example, internal and external antennas for portable telephones, transceivers for wireless LAN (host device, sub device), and among the above, the present invention is extremely useful especially for those that require a size reduction.

EXAMPLES

The examples of the present invention will be described below. However, the present invention is not limited thereto.

Examples 1-27 and Comparative Examples 1-5

Each ingredient powder as a magnetic material for antennas comprising a M-type hexagonal ferrite powder comprising MA and MB shown in Tables 1 and 2, respectively, with a composition ratio represented by x in the same tables, and if needed, additives (at least one kind of $SiO_2$, CaO and $Bi_2O_3$) with an content ratio shown in the same tables were prepared to produce a sample (sintered compact) for evaluating physical properties and characteristics of each example and each comparative example. The ingredient powder was prepared by: subjecting each material to a wet-blending for 16 hours with a ball mill made of steel; calcining the mixed powder for 2 hours under 1200° C. in the atmosphere; then after adding the above additives to the mixed powder, grinding it for 16 hours by a ball mill made of steel. After the granulated ingredient powder was formed into a predetermined shape under a pressure of 100 MPa, a baking process of the ingredient powder was performed for the compact for 2 hours in the atmosphere under a temperature of 1100 to 1380° C. (1200° C. in Example 1, 1250° C. in Example 2, 1350° C. in Example 3, and the other examples use these values as an index to make fine-adjustments in accordance with the target average crystal particle diameter.) In Examples 13 and 25-27, an ingredient powder of Example 5 was used and a burn up agent (polystyrene with an average particle diameter of 10 μm) was further used to adjust the desired void ratio.

Reference Examples 1 and 2

A sample (sintered compact) for evaluating physical properties and characteristics of reference examples 1 and 2 was prepared in a similar manner to that of the above examples and comparative examples except that a dielectric powder based on formula $CaTiO_3$ and a Y-type hexagonal ferrite powder represented by formula $Ba_2CO_2Fe_{12}O_{22}$ have been used as the ingredient powder.

(Evaluation for Physical Properties and Characteristics)<
Average Crystal Particle Diameter>

The average crystal particle diameter was determined from an average of N=50 by observing the sintered compact sample surface after being etched by concentrated hydrochloric acid with a scanning electron microscope.
<Material Constant>

Each ring-shaped sample (outer diameter 7 mm×inner diameter 3.04 mm×thickness 1-2 mm) was formed from a sintered compact of each prepared ingredient powder. The real part $\mu r$, the imaginary part $\mu r''$ and the magnetic loss tan $\delta\mu$ of the complex relative permeability $\mu r$ of each obtained ring-shaped sample under a room temperature of 25° C. were derived from the result of S parameter at a frequency of 0.1-18 GHz that was measured using a network analyzer (manufactured by Agilent Corporation: HP8510C). Each rod-shaped sample (1 mm×1 mm×80 mm) was formed from the sintered compact of each prepared ingredient powder. The real part $\in r'$, the imaginary part $\in r''$ and the dielectric loss tan $\delta\mu$ of the complex relative permittivity $\in r$ of each obtained rod-shaped sample under a room temperature of 25° C. were measured through a cavity resonator perturbation method at a frequency of 2 GHz by using the same network analyzer.

Furthermore, the natural resonance frequency f0(n) (frequency in which a value of the imaginary part $\mu''$ in a frequency band of 5 GHz or more represents a peak) and the magnetic domain wall resonance frequency f0(d·w) (frequency in which a value of the imaginary part $\mu''$ in a frequency band of 1 GHz or less represents a peak) were identified from the frequency dependence of the imaginary part $\mu r''$ of the complex relative permeability of each ring-shaped sample.
<Antenna Characteristic>

Each rectangular block sample (10 mm×3 mm×4 mm) was formed from a sintered compact of each prepared ingredient powder and an electrode was formed on a surface of each obtained rectangular block sample (an electrode pattern was appropriately adjusted by respective samples), thereby producing each chip antenna having a resonance frequency of 1.5 GHz with a configuration that is substantially the same as that shown in FIG. 1. Each obtained chip antenna was mounted on a planar substrate, and in a state where an end of the electrode is connected to the feed electrode, the maximum radiant efficiency and bandwidth (range of frequency centered around 1.5 GHz in which the radiant efficiency is 50% or more) were evaluated from the radiant efficiency measured using a small 3D emitting directivity measurement device (manufactured by SATIMO Corporation: STARLAB).
<Void Ratio>

A void ratio was converted to a volume occupancy by observing the sintered compact sample surface after being etched by concentrated hydrochloric acid with a scanning electron microscope and calculating the area occupied by the void with an image analysis process, and then multiplying the void shape by ⅔ considering that the shape is spherical.

The obtained measurement evaluation results are shown in Tables 1 and 2. It has been discovered from these results that all of the following were satisfied: for the ingredient powder and antenna of the example according to the present invention, the natural resonance frequency f0(n) was equal to or greater than 5 GHz and the magnetic domain wall resonance frequency f0(d·w) was equal to or smaller than 0.8 GHz; the real part $\mu'r$ of a complex relative permeability at 2 GHz was equal to or greater than 1.2; the magnetic loss was equal to or smaller than 0.01; the real part $\in'r$ of a complex relative permittivity at 2 GHz was equal to or smaller than 30; and the dielectric loss was equal to or smaller than 0.05. Advantages over the comparative examples and reference examples have been found. Based on the comparison between Examples 5, 13 and 25-27, it has been discovered that those with a void ratio that was adjusted to 1-40% have maximum radiant efficiency and bandwidth being significantly increased and especially have superior antenna efficiency compared to those that have not been adjusted.

TABLE 1

| | MA | MB | x | SiO$_2$ (% by mass) | CaO (% by mass) | Bi$_2$O$_3$ (% by mass) | Average Crystal Particle Diameter (μm) | Magnetic Domain Wall Resonance Frequency (GHz) | Natural Resonance Frequency (GHz) |
|---|---|---|---|---|---|---|---|---|---|
| Reference Example 1 | — | — | — | — | — | — | — | — | — |
| Reference Example 2 | — | — | — | — | — | — | 1 | 4.5 | 9.7 |
| Comparative Example 1 | Ba | — | 0 | — | — | — | 1 | 1.0 | >18 |
| Comparative Example 2 | Ba | — | 0 | — | — | — | 50 | 0.4 | 17.0 |
| Comparative Example 3 | Ba | Ti/Mn | 3 | — | — | — | 2 | 0.7 | 15.0 |
| Example 1 | Ba | Ti/Mn | 3 | — | — | — | 5 | 0.4 | 14.5 |
| Example 2 | Ba | Ti/Mn | 3 | — | — | — | 20 | 0.2 | 14.5 |
| Example 3 | Ba | Ti/Mn | 3 | — | — | — | 50 | 0.2 | 14.5 |
| Comparative Example 4 | Ba | Ti/Mn | 4 | — | — | — | 3 | 0.2 | 7.6 |
| Example 4 | Ba | Ti/Mn | 4 | — | — | — | 20 | 0.2 | 6.8 |
| Example 5 | Ba | Ti/Mn | 4 | — | — | — | 50 | 0.2 | 6.4 |
| Comparative Example 5 | Ba | Zr/Mn | 1.5 | — | — | — | 2 | 0.9 | 8.8 |
| Example 6 | Ba | Zr/Mn | 1.5 | — | — | — | 20 | 0.5 | 7.9 |
| Example 7 | Ba | Ti/Mn | 4 | 0.5 | — | — | 50 | 0.2 | 6.2 |
| Example 8 | Ba | Ti/Mn | 4 | — | 2 | — | 50 | 0.2 | 6.0 |
| Example 9 | Ba | Ti/Mn | 3 | — | — | 5 | 50 | 0.3 | 14.1 |
| Example 10 | Ba | Ti/Mn | 4 | 0.4 | — | 3 | 20 | 0.2 | 6.8 |
| Example 11 | Ba | Ti/Mn | 4 | 0.4 | 1 | — | 20 | 0.1 | 6.9 |
| Example 12 | Ba | Ti/Mn | 4 | — | 0.8 | 3 | 20 | 0.2 | 6.8 |
| Example 13 | Ba | Ti/Mn | 4 | — | — | — | 50 | 0.2 | 6.4 |
| Example 14 | Sr | Zr/Mn | 1.5 | — | — | — | 20 | 0.4 | 7.4 |
| Example 15 | Ba | Al | 1.5 | — | — | — | 35 | 0.3 | >18 |
| Example 16 | Ba | Cr | 1.5 | — | — | — | 35 | 0.3 | >18 |
| Example 17 | Ba | Sc | 1.2 | — | — | — | 40 | 0.4 | 10.3 |
| Example 18 | Ba | In | 1.6 | — | — | — | 40 | 0.4 | 12.0 |
| Example 19 | Ba | Sn/Mn | 1.6 | — | — | — | 40 | 0.5 | 8.0 |
| Example 20 | Ba | Ti/Ni | 3 | — | — | — | 40 | 0.8 | 13.0 |
| Example 21 | Ba | Ti/Zn | 3.4 | — | — | — | 45 | 0.6 | 8.0 |
| Example 22 | Ba | Ti/Mg | 3.5 | — | — | — | 40 | 0.7 | 11.0 |
| Example 23 | Ba | Ti/Cu | 4.3 | — | — | — | 45 | 0.5 | 8.0 |
| Example 24 | Ba | Ti/Co | 2 | — | — | — | 40 | 0.7 | 9.3 |

| | Void Ratio (% by volume) | Relative Permeability μ'r @2 GHz | Magnetic Loss Tanδ μ @2 GHz | Relative Permittivity ε'r @2 GHz | Dielectric Loss Tanδ ε @2 GHz | Maximum Radiant Efficiency (%) | Bandwidth @50% (MHz) |
|---|---|---|---|---|---|---|---|
| Reference Example 1 | — | 1.00 | 0.000 | 20.0 | 0.003 | 64 | 37 |
| Reference Example 2 | — | 2.44 | 0.061 | 20.4 | 0.017 | 33 | 0 |
| Comparative Example 1 | — | 1.03 | 0.085 | 16.1 | 0.003 | 25 | 0 |
| Comparative Example 2 | — | 1.12 | 0.001 | 14.6 | 0.003 | 61 | 32 |
| Comparative Example 3 | — | 1.19 | 0.055 | 16.8 | 0.003 | 27 | 0 |
| Example 1 | — | 1.25 | 0.008 | 18.2 | 0.003 | 65 | 38 |
| Example 2 | — | 1.26 | 0.002 | 17.3 | 0.003 | 66 | 41 |
| Example 3 | — | 1.28 | 0.002 | 18.3 | 0.003 | 66 | 40 |
| Comparative Example 4 | — | 1.38 | 0.012 | 17.6 | 0.003 | 50 | 22 |
| Example 4 | — | 1.43 | 0.002 | 19.5 | 0.003 | 65 | 39 |
| Example 5 | — | 1.45 | 0.002 | 17.1 | 0.003 | 66 | 41 |
| Comparative Example 5 | — | 1.43 | 0.157 | 16.8 | 0.003 | 12 | 0 |
| Example 6 | — | 1.60 | 0.008 | 20.1 | 0.003 | 66 | 40 |
| Example 7 | — | 1.48 | 0.002 | 16.1 | 0.003 | 67 | 42 |
| Example 8 | — | 1.50 | 0.002 | 16.0 | 0.003 | 67 | 42 |
| Example 9 | — | 1.25 | 0.006 | 16.1 | 0.003 | 66 | 40 |
| Example 10 | — | 1.28 | 0.006 | 17.2 | 0.003 | 65 | 39 |
| Example 11 | — | 1.48 | 0.006 | 18.0 | 0.003 | 66 | 40 |
| Example 12 | — | 1.32 | 0.008 | 17.6 | 0.003 | 64 | 38 |
| Example 13 | 30 | 1.27 | 0.002 | 14.4 | 0.003 | 67 | 42 |
| Example 14 | — | 1.51 | 0.006 | 23.7 | 0.003 | 64 | 37 |
| Example 15 | — | 1.20 | 0.003 | 20.2 | 0.003 | 65 | 38 |
| Example 16 | — | 1.20 | 0.004 | 19.7 | 0.003 | 64 | 38 |
| Example 17 | — | 1.72 | 0.004 | 19.3 | 0.003 | 67 | 42 |
| Example 18 | — | 1.46 | 0.004 | 18.4 | 0.003 | 66 | 41 |
| Example 19 | — | 1.52 | 0.004 | 20.3 | 0.003 | 66 | 40 |
| Example 20 | — | 1.20 | 0.007 | 20.7 | 0.003 | 64 | 37 |
| Example 21 | — | 1.50 | 0.006 | 17.8 | 0.003 | 65 | 39 |
| Example 22 | — | 1.60 | 0.006 | 17.5 | 0.003 | 65 | 40 |
| Example 23 | — | 1.38 | 0.005 | 17.3 | 0.003 | 64 | 38 |
| Example 24 | — | 1.72 | 0.006 | 20.1 | 0.003 | 65 | 39 |

TABLE 2

|  | MA | MB | x | SiO$_2$ (% by mass) | CaO (% by mass) | Bi$_2$O$_3$ (% by mass) | Average Crystal Particle Diameter (μm) | Magnetic Domain Wall Resonance Frequency (GHz) | Natural Resonance Frequency (GHz) |
|---|---|---|---|---|---|---|---|---|---|
| Example 5 | Ba | Ti/Mn | 4 | — | — | — | 50 | 0.2 | 6.4 |
| Example 25 | Ba | Ti/Mn | 4 | — | — | — | 50 | 0.2 | 6.4 |
| Example 13 | Ba | Ti/Mn | 4 | — | — | — | 50 | 0.2 | 6.4 |
| Example 26 | Ba | Ti/Mn | 4 | — | — | — | 50 | 0.2 | 6.4 |
| Example 27 | Ba | Ti/Mn | 4 | — | — | — | 50 | 0.2 | 6.4 |

|  | Void Ratio (% by volume) | Relative Permeability μ'r @2 GHz | Magnetic Loss Tanδ μ @2 GHz | Relative Permittivity ε' r @2 GHz | Dielectric Loss Tanδ ε @2 GHz | Maximum Radiant Efficiency (%) | Bandwidth @50% (MHz) |
|---|---|---|---|---|---|---|---|
| Example 5 | — | 1.45 | 0.002 | 17.1 | 0.003 | 66 | 41 |
| Example 25 | 5 | 1.42 | 0.002 | 16.8 | 0.002 | 67 | 42 |
| Example 13 | 30 | 1.27 | 0.002 | 14.4 | 0.002 | 67 | 42 |
| Example 26 | 40 | 1.24 | 0.002 | 11.5 | 0.002 | 66 | 42 |
| Example 27 | 45 | 1.20 | 0.002 | 10.0 | 0.002 | 64 | 38 |

As described above, according to the magnetic material for antennas of the present invention, a particular M-type hexagonal ferrite is included as the main phase and the average crystal particle diameter is equal to or greater than 5 μm. This enables high efficiency and the bandwidth to be maintained sufficiently widely at high frequencies as well as a size reduction of the antenna or a wireless communication device comprising the same, and further improving productivity and economical efficiency. Thus, the magnetic material for antennas according to the present invention, as well as the antenna and the wireless terminal device using the same are useful in widening the band and reducing the size in antenna use for high frequency signals of, for example, 1 GHz or more, and can be widely and effectively used for various wireless terminal devices or portable terminal devices such as portable telephones, game machines, PDA, personal computers, internal antennas, transceivers for wireless LAN and cards for information communication, as well as systems and equipment comprising the same.

DESCRIPTION OF REFERENCE NUMERALS

1 . . . Antenna; 2 . . . Base substrate; 4 . . . Conductor; 6 . . . Feed terminal; 10 . . . Portable telephone (Wireless communication device); 10CA . . . First casing; 10CB . . . Second casing; 11 . . . First antenna (antenna); 12 . . . Second antenna (antenna); 13 . . . Hinge.

What is claimed is:

1. A magnetic material for antennas, comprising:
a M-type hexagonal ferrite represented by the following general formula (1) as a main phase:

$$MA \cdot Fe_{12-x} \cdot MB_x \cdot O_{19} \quad (1)$$

where MA is at least one selected from the group consisting of Sr and Ba,
MB is MC or MD,
MC is at least one selected from the group consisting of Al, Cr, Sc and In,
MD is an equivalent mixture of at least one selected from the group consisting of Ti, Sn and Zr and at least one selected from the group consisting of Ni, Zn, Mn, Mg, Cu and Co,
X is a number from 1 to 5; and
at least one compound selected from the group consisting of 0.1-3% by mass of SiO$_2$, 0.5-5% by mass of CaO, and 0.5-8% by mass of Bi$_2$O$_3$,
wherein an average crystal particle diameter of a sintered compact sample surface of the magnetic material after etching by concentrated hydrochloric acid is equal to or greater than 20 μm as determined by observation with a scanning electron microscope, and
a natural resonance frequency f0(n) of the magnetic material is configured to be equal to or greater than 5 GHz and a magnetic domain wall resonance frequency f0(d·w) of the magnetic material is configured to be equal to or smaller than 0.8 GHz.

2. The magnetic material for antennas according to claim 1, wherein a real part of a complex relative permeability at 2 GHz is equal to or greater than 1.2, and a magnetic loss at 2 GHz is equal to or smaller than 0.01.

3. The magnetic material for antennas according to claim 1, wherein a real part of a complex relative permittivity at 2 GHz is equal to or smaller than 30, and a dielectric loss at 2 GHz is equal to or smaller than 0.05.

4. The magnetic material for antennas according to claim 2, wherein a real part of a complex relative permittivity at 2 GHz is equal to or smaller than 30, and a dielectric loss at 2 GHz is equal to or smaller than 0.05.

5. An antenna comprising:
a base substance comprising the magnetic material for antennas according to claim 1;
a conductor that is provided on a surface or inside of the base substance; and
a feed terminal that is connected to the conductor and supplies an electrical energy to the conductor.

6. An antenna according to claim 5, wherein the base substance is a sintered compact with a void ratio of 1-40%.

7. A wireless terminal device comprising the antenna according to claim 5.

8. A wireless terminal device comprising the antenna according to claim 6.

9. The magnetic material for antennas according to claim 1, wherein the average crystal particle diameter is in the range of 20 μm to 50 μm.

* * * * *